United States Patent Office 3,360,521
Patented Dec. 26, 1967

3,360,521
3-SUBSTITUTED-5,6-ALKYLENEURACILS
Edward J. Soboczenski, Chadds Ford, Pa., assignor to E. I. du Pont de Nemours and Company, Wilmington, Del., a corporation of Delaware
No Drawing. Original application Oct. 22, 1962, Ser. No. 232,311, now Patent No. 3,235,360, dated Feb. 15, 1966. Divided and this application Dec. 27, 1965, Ser. No. 516,686
6 Claims. (Cl. 260—260)

This is a divisional application of co-pending application Ser. No. 232,311, filed Oct. 22, 1962, and now U.S. Patent No. 3,235,360, which in turn is a continuation-in-part of application Ser. No. 89,674, filed Feb. 16, 1961 and application Ser. No. 12,958, filed Mar. 7, 1960, both of which are now abandoned.

This invention is directed to novel 3-substituted-5,6-alkyleneuracils and various salts thereof. More specifically, the present invention is directed to uracils of the formula (1)

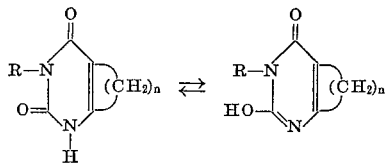

where

R is a substituted or unsubstituted cycloalkyl radical containing 3 through 10 carbon atoms, a substituted or unsubstituted cycloalkenyl radical containing 4 through 10 carbon atoms, or a

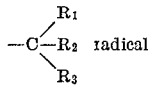

where $R_1$ is methyl or ethyl,
$R_2$ is alkyl containing 1 through 5 carbon atoms, and
$R_3$ is hydrogen or methyl, and
$n$ is 3, 4 or 5.

Also included within the invention are salts of the uracils of Formula 1 formed with such cations as sodium, potassium, lithium, and quaternary ammonium.

For Formula 1, illustrative radicals of the terms "cycloalkyl" and "cycloalkenyl," are:

cyclopropyl
cyclohexyl
cyclohexenyl
cyclopentyl
cyclopentenyl
norbornyl
norbornenyl
bicyclo (2,2,2) octyl
bicyclo (2,2,2) octenyl
cyclobutyl
cyclobutenyl
hexahydroindanyl
tetrahydroindanyl
hexahydroindenyl
hexahydro-4,7-methanoindenyl
tetrahydro-4,7-methanoindanyl
hexahydro-4,7-methanoindanyl
decahydronaphthyl
tetrahydronaphthyl The cycloalkyl or cycloalkenyl radical representing R in Formula 1 may be substituted with a substituent selected from the group consisting of alkyl containing 1 through 4 carbon atoms, methoxy, chlorine and bromine.

The compounds of the present invention represent a new class of herbicides offering farmers and property owners a new and effective method for the control of undesirable vegetation.

Certain of these uracils exhibit selective action in crops. By properly selecting a compound of the invention and a rate and time of application, weeds growing in fields of such economic crops as corn, cotton, asparagus, sugar beets, red beets, mangels, spinach, potatoes, peanuts and pineapple can be controlled. This selective activity is described in more detail in the examples which follow.

These compounds are also useful for general weed control on industrial sites, railroad rights-of-way, and areas adjacent to croplands.

The compounds of this invention are also effective agents for the control of aquatic weeds, including algae.

The concentrations at which the compounds of this invention are to be used will vary according to the result desired, the type of vegetation, the formulation used, the mode of application, weather conditions, foliage density, and other similar factors. Since so many factors play a role, it is not possible to indicate a concentration suitable for all situations. Generally, when they are used for pre-emergence treatment in crops, these compounds are used at concentrations of at least about 0.5 pound of active ingredient per acre. Concentrations of from 0.5 to 3 pounds per acre are preferred.

When used in non-crop applications, these compounds are used at concentrations of from 10 to 30 pounds of active ingredient per acre. The optimum concentrations to be used in any particular application will be readily apparent to one skilled in the art.

The compounds of this invention are strong absorbers of ultraviolet radiation. For example, 3-cyclohexyl-5,6-trimethyleneuracil in addition to strong and absorption at about 220 m$\mu$ shows a broad absorption peak near 270 m$\mu$. The extinction coefficient is about 7,500. Consequently compounds of this invention are useful as ultraviolet screening agents. In a typical application a compound is milled into a vinyl plastic in order to retard the deterioration of the plastic by sunlight.

The uracil compounds of Formula 1 can be prepared according to the following equations:

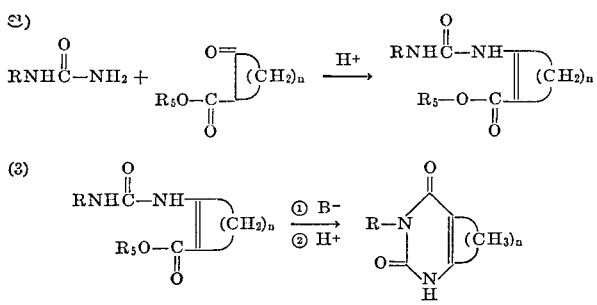

In Equations 2 and 3 R, and $n$ have the same meaning as in Formula 1; $R_5$ is an alkyl radical of 1–6 carbon atoms, $H^+$ is an acid, and $B^-$ is a base.

The reaction sequence consists of two steps: first, the acid catalyzed condensation of a 1-substituted urea with an alkyl 2-cycloalkanone-1-carboxylate to give the ureido intermediate; and, second, the alkaline ring closure of this intermediate to the salt of the uracil product, followed by treatment with acid to liberate the free uracil.

The first step, illustrated by Equation 2, is best carried out by dissolving or suspending the 1-substituted urea in a solvent such as xylene, benzene or a mixture of benzene and dioxane, and heating to reflux. To this solution is then added a mixture of the acid catalyst in a slight excess of the alkyl 2-cycloalkanone-1-carboxylate. Suitable acid catalysts are phosphoric, polyphosphoric, formic, chloroacetic, or Lewis acids such as $BF_3$ and $AlCl_3$. The mixture is stirred and heated to reflux until the water, split out during the reaction and collected in a suitable apparatus, ceases to be given off. The clear solution is decanted or filtered and then concentrated to give the intermediate ureido derivative.

In the second step, illustrated by Equation 3 the ureido intermediate is dissolved in alcohol containing a slight excess of base, preferably an alkali metal alkoxide or hydroxide, and the solution is refluxed for a short time. This step effects the ring closure. The salt of the uracil is obtained by concentrating this solution to dryness. The free uracil is prepared by acidifying an aqueous solution of the salt, and then isolating the solid.

These compounds can also be prepared as described in Archives of Biochem. and Biophys., 83, 141 (1959).

The salts of the compounds of Formula 1 are prepared by conventional methods such as dissolving the free uracil in an aqueuos or nonaqueous solution of at least an equimolar amount of a base or basic salt containing the desired cation. For example, a sodium salt can be prepared by dissolving the uracil in water containing an equimolar amount of sodium hydroxide. The salt can then be isolated from the solution by removal of the water.

The quaternary ammonium salts of the compounds of Formula 1 are prepared by reacting the uracil compound with an appropriate quaternary ammonium hydroxide. Since these hydroxides are generally available in solution, the reaction is most conveniently carried out in the same solvent. If the solvent-free salt is desired, it can be easily prepared by removing the solvent.

Alternatively, the quaternary ammonium salts of the uracils can be prepared in a dry inert solvent such as toluene or xylene. The sodium salt of the uracil is first prepared and the appropriate quaternary ammonium halide is then added with stirring and, if necessary, mild heating. The sodium halide which forms is removed by filtration, leaving the quaternary ammonium salt of the uracil in solution. If desired, the solvent-free salt can be prepared by removing the solvent, preferably in vacuo.

The compounds of the invention can be prepared for use by incorporating them with adjuvants.

The amount of herbicide in such preparations can vary over a wide range according to need. Generally speaking, they will contain from about 0.5% to 95%, by weight of a uracil.

Powder and dust preparations can be made by mixing the compounds of the invention with finely divided solids such as talcs, natural clays, pyrophillite, diatomaceous earth; flours such as walnut shell, wheat, redwood, soya bean and cotton seed; or inorganic substances such as magnesium carbonate, calcium carbonate, calcium phosphate, sulfur and lime. These preparations are made by thoroughly blending the active ingredient and the solid. The particles in such preparations should be less than 50 microns in average diameter, preferably about 20 microns.

Water-soluble powders can be prepared by blending a suitable uracil or uracil salt with such water-soluble alkaline powders as silicates, carbonates, phosphates or hydroxides, and optionally with water-soluble diluents such as urea or dextrose.

Granules and pellets can be made by mixing a finely divided uracil or salt with a suitable clay such as kaolinite, montmorillonite or attapulgite, moistening this mixture with from 15 to 20% by weight of water, and then extruding the mass through a suitable die under pressure. The extrusions are cut into pre-determined lengths and then dried. These pellets can be granulated if desired.

Granules or pellets can also be prepared by spraying a suspension or solution of a compound of the invention onto the surface of a preformed granule of clay, vermiculite or other suitable granular material. If the compound is in solution, it will penetrate into the pores of the granule and so will adhere without the aid of a binding agent. When the active material is insoluble in the liquid and is carried as a suspension, it is preferable that a binding agent such as goulac, dextrin, swollen starch, glue or polyvinyl alcohol be added. In either case, the granule is then dried and ready for use.

The compounds of the invention can also be prepared in liquids. Water and aliphatic and aromatic hydrocarbons, especially those derived from petroleum and having boiling points of from 125° C. to 400° C. are preferred. Hydrocarbons having lower boiling points are less useful because of their undesirable volatilization characteristics and inflammability. These liquid preparations are made by dissolving the active in the liquid, or, if the active is insoluble in the liquid, by milling the components in a mill such as a pebble mill until the particles have average diameters of from 1 to 50 microns, preferably 5 to 20 microns.

The herbicidal preparations, whatever physical form they take, can also contain a surface-active agent. The surfactant renders the preparations readily dispersible in liquids and improves their action on waxy leaves and the like. For general application, surface-active agents are used in the preparations at concentrations of from about 1 to 10% by weight. Levels of from 0.5 to 6 parts of surfactant for each part of uracil or uracil salt, however, give unusual and unexpected results. Preparations having these higher levels of surfactants show greater herbicidal effectiveness than can be expected from a consideration of activity of the components used separately.

The term "surface-active agent" is intended to include wetting agents, dispersing agents, suspending agents and emulsifying agents. Surface-active agents suitable for use are set forth in "Detergents and Emulsifiers . . . Annual," 1965, John W. McCutcheon, Inc., Morristown, New Jersey. Other surface-active agents which can be used in these preparations are listed in U.S. Patents 2,139,276; 2,412,510; 2,426,417; and 2,655,447.

The preparations can also contain adhesives, corrosion inhibitors, antifoam agents, dyes, and pigments, anticaking agents, and hard water stabilizers.

The salts of the compounds of Formula 1 are especially advantageous for use as herbicides because many are soluble in water and can be applied as aqueous solutions.

The herbicidal compositions of this invention can be formulated to contain two or more of the compounds of the invention. They can also be formulated to contain other known herbicides in addition to the uracils or their salts to give compositions which have advantages over the individual components.

Among the known herbicides which can be combined with the compounds of the invention are:

*Substituted ureas*

3-(3,4-dichlorophenyl)-1,1-dimethylurea
3-(4-chlorophenyl)-1,1-dimethylurea
3-phenyl-1,1-dimethylurea
3-(3,4-dichlorophenyl)-3-methoxy-1,1-dimethylurea
3-(4-chlorophenyl)-3-methoxy-1,1-dimethylurea
3-(3,4-dichlorophenyl)-1-n-butyl-1-methylurea
3-(3,4-dichlorophenyl)-1-methoxy-1-methylurea
3-(4-chlorophenyl)-1-methoxy-1-methylurea
3-(3,4-dichlorophenyl)-1,1,3-trimethylurea
3-(3,4-dichlorophenyl)-1,1-diethylurea
3-(p-chlorophenoxyphenyl)-1,1-dimethylurea These ureas can be mixed with the compounds of the invention in proportions of from 1:4 to 4:1, respectively, the preferred ratio being 1:2 to 2:1.

*Substituted triazines*

2-chloro-4,6-bis(ethylamino)-s-triazine
2-chloro-4-ethylamino-6-isopropylamino-s-triazine
2-chloro-4,6-bis(methoxypropylamino)-s-triazine
2-methoxy-4,6-bis(isopropylamino)-s-triazine
2-ethylamino-4-(2-methoxyethylamine)-6-chloro-s-triazine
2-isopropylamino-4-methoxyethylamino-6-methylmercapto-s-triazine
2-methylmercapto-4,6-bis(isopropylamino)-s-triazine
2-methylmercapto-4,6-bis(ethylamino)-s-triazine
2-methylmercapto-4-ethylamino-6-isopropylamino-s-triazine
2-methoxy-4,6-bis(ethylamino)-s-triazine
2-methoxy-4-ethylamino-6-isopropylamino-s-triazine
2-chloro-4,6-bis(isopropylamino)-s-triazine These triazines can be mixed with the compounds of the invention in proportions of from 1:4 to 4:1, respectively, the preferred ratio being 1:2 to 2:1.

*Phenols*

Dinitro-o-sec-butylphenol and its salts
Pentachlorophenol and its salts

These phenols can be mixed with the compounds of the invention in the proportions of 1:10 to 20:1, respectively, the preferred ratio being 1:5 to 5:1.

*Carboxylic acids and derivatives*

The following carboxylic acids and derivatives can be mixed with the compounds of the invention in the listed respective proportions:

A.

2,3,6-trichlorobenzoic acid and its salts
2,3,5,6-tetrachlorobenzoic acid and its salts
2-methoxy-3,5,6-trichlorobenzoic acid and its salts
2-methoxy-3,6-dichlorobenzoic acid and its salts
3-amino-2,5-dichlorobenzoic acid and its salts
3-nitro-2,5-dichlorobenzoic acid and its salts
2-methyl-3,6-dichlorobenzoic acid and its salts
2,3-dichloro-6-methylbenzoic acid and its salts
2,4-dichlorophenoxyacetic acid and its salts and esters
2,4,5-trichlorophenoxyacetic acid and its salts and esters
(2-methyl-4-chlorophenoxy)acetic acid and its salts and esters
2-(2,4,5-trichlorophenoxy)propionic acid and its salts and esters
2-(2,4,5-trichlorophenoxy)ethyl-2,2-dichloropropionate
4-(2,4-dichlorophenoxy)butyric acid and its salts and esters
4-(2-methyl-4-chlorophenoxy)butyric acid and its salts and esters
2,3,6-trichlorobenzyloxypropanol Mixed in a 1:20 to 8:1 ratio, preferably a 1:4 to 4:1 ratio.

B. 2,6-dichlorobenzonitrile

Mixed in a 1:4 to 4:1 ratio, preferably a 1:3 to 3:1 ratio.

C. Trichloroacetic acid and its salts

Mixed in a 1:4 to 25:1 ratio, preferably a 1:2 to 10:1 ratio.

D. 2,2-dichloropropionic acid and its salts

Mixed in a 1:4 to 10:1 ratio preferably a 1:2 to 5:1 ratio.

E

N,N-di(n-propyl)thiolcarbamic acid, ethyl ester
N,N-di(n-propyl)thiolcarbamic acid, n-propyl ester
N-ethyl-N-(n-butyl)thiolcarbamic acid, ethyl ester
N-ethyl-N-(n-butyl)thiolcarbamic acid, n-propyl ester Mixed in a 1:2 to 24:1 ratio, preferably a 1:1 to 12:1 ratio.

F

N-phenylcarbamic acid, isopropyl ester
N-(m-chlorophenyl)carbamic acid, isopropyl ester
N-(m-chlorophenyl)carbamic acid, 4-chloro-2-butynyl ester Mixed in a 1:2 to 24:1 ratio, preferably a 1:2 to 12:1 ratio.

G. 2,3,6-trichlorophenylacetic acid and its salts

Mixed in a 1:20 to 8:1 ratio, preferably a 1:4 to 4:1 ratio.

H 2-chloro-N,N-diallylacetamide
Maleic hydrazide

Mixed in a 1:2 to 10:1 ratio, preferably a 1:1 to 5:1 ratio.

*Inorganic and mixed inorganic-organic salts*

The following salts can be mixed with the uracils in the listed proportions:

A

Calcium propylarsonate
Disodium monomethylarsonate
Octyl-dodecylammoniummethylarsonate
Dimethylarsinic acid Mixed in a 1:4 ratio, preferably a 1:2 to 2:1 ratio.

B. Sodium arsenite

Mixed in a 1:10 to 40:1 ratio, preferably a 1:5 to 25:1 ratio.

C

Lead arsenate
Calcium arsenate

Mixed in a 150:1 to 600:1 ratio, preferably a 100:1 to 400:1 ratio.

D

Sodium tetraborate hydrated, granulated
Sodium metaborate
Sodium pentaborate
Polychloroborate
Unrefined borate ore, such as borascu Mixed in a 3:1 to 1500:1 ratio, preferably a 6:1 to 1000:1 ratio.

E. Ammonium thiocyanate

Mixed in a 1:10 to 20:1 ratio, preferably a 1:5 to 5:1 ratio.

F. Sodium chlorate

Mixed in a 1:1 to 40:1 ratio, preferably a 2:1 to 20:1 ratio.

G. Ammonium sulfamate

Mixed in a 1:1 to 100:1 ratio, preferably a 1:1 to 50:1 ratio.

*Other organic herbicides*

The following herbicides can be mixed with the uracils in the listed respective proportions:

A 1,1'-ethylene-2,2'-dipyridylium cation
1,1'-ethylene-4,4'-dipyridylium cation

Mixed in a 1:20 to 16:1 ratio, preferably a 1:5 to 5:1 ratio.

B. 3-amino-1,2,4-triazole

Mixed in a 1:20 to 20:1 ratio, preferably a 1:5 to 5:1 ratio.

C. 3,6-endoxohexahydrophthalic acid

Mixed in a 1:4 to 20:1 ratio, preferably a 1:2 to 10:1 ratio.

D

Diphenylacetonitrile
N,N-dimethyl-α,α-diphenylacetamide
N,N-di(n-propyl)2,6-dinitro-4-trifluoromethylaniline
N,N-di(n-propyl)-2,6-dinitro-4-methylaniline Mixed in a 1:10 to 30:1 ratio, preferably a 1:5 to 20:1 ratio.

E

O-(2,4-dichlorophenyl)-O-methyl-isopropylphosphoramidothioate
2,3,5,6-tetrachloroterephthalic acid, dimethyl ester Mixed in a 1:4 to 20:1 ratio, preferably a 1:3 to 15:1 ratio.

F 2,4-dichloro-4'-nitrodiphenyl ether
2,3,5-trichloro-4-pyridinol
4-amino-3,5,6-trichloropicolinic acid Mixed in a 1:10 to 30:1 ratio, preferably a 1:5 to 20:1 ratio.

*Other substituted uracils*

The compounds of the invention can be mixed with other substituted uracils, in the respective proportions listed below.

3-isopropyl-5-bromo-6-methyluracil
3-isopropyl-5-chloro-6-methyluracil
3-sec-butyl-5-bromo-6-methyluracil
3-sec-butyl-5-chloro-6-methyluracil
3-cyclohexyl-5-bromo-6-methyluracil
3-cyclohexyl-5-chloro-6-methyluracil
3-tert-butyl-5-bromo-6-methyluracil
3-tert-butyl-5-chloro-6-methyluracil Mixed in a 1:6 to 6:1 ratio, preferably a 1:4 to 4:1 ratio.

3-cyclohexyl-6-methyluracil
3-cyclohexyl-6-ethyluracil
3-cyclohexyl-6-sec-butyluracil
3-cyclohexyl-6-propyluracil
3-cyclopentyl-6-methyluracil
3-cyclohexyluracil Mixed in a 1:6 to 6:1 ratio, preferably a 1:4 to 4:1 ratio.

3-isopropyl-5-bromouracil
3-sec-butyl-5-bromouracil
3-sec-butyl-5-chlorouracil
3-cyclohexyl-5-bromouracil
3-cyclohexyl-5-chlorouracil Mixed in a 1:4 to 4:1 ratio, preferably a 1:2 to 2:1 ratio.

3-isopropyl-1-trichloromethylthio-5-bromo-6-methyluracil
3-cyclohexyl-1-trichloromethylthio-5-bromo-6-methyluracil
3-sec-butyl-1-acetyl-5-bromo-6-methyluracil
3-isopropyl-1-acetyl-5-bromo-6-methyluracil
3-isopropyl-1-trichloromethylthio-5-chloro-6-methyluracil Mixed in a 1:4 to 4:1 ratio, preferably a 1:2 to 2:1 ratio.

Many of the above materials, e.g. borates, arsonates, dinitro sec-butylphenol, etc., act as bactericides and fungicides. Addition of these compounds, or compounds of similar action, inhibit the degradation and inactivation of the herbicidal uracils by soil micro-organisms, and, consequently increase their usefulness as herbicides.

EXAMPLES

This invention will be better understood by the following examples concerning the preparation of the compounds of the invention and the preparation and use of herbicidal compositions containing these compounds.

PREPARATION OF COMPOUNDS

*Example 1.—Preparation of 3-isopropyl-5,6-trimethyleneuracil*

A mixture of 404 parts by weight of isopropylurea, 686 parts by weight of ethyl 2-cyclopentanone-1-carboxylate, 40 parts by weight of phosphoric acid, 1000 parts by weight of dioxane, and 879 parts by weight of benzene is stirred at reflux for 4 hours. During this time, the water given off by the reaction is trapped out. The solvent is stripped at reduced pressure and a portion of the resulting solid is recrystallized from cyclohexane to give 2-(3-isopropylureido)-1-cyclopentene carboxylic acid, ethyl ester.

The remaining unrecrystallized solid is dissolved in 2360 parts by weight of absolute alcohol containing 248 parts by weight of sodium methoxide, and is refluxed for 10 minutes. The solvent is stripped at reduced pressure and the residue dissolved in water, cooled, and acidified. The solid is filtered off, dried, and recrystallized from ethanol to give the desired 3-isopropyl-5,6-trimethyleneuracil, melting at 222–223.5° C.

*Example 2.—Preparation of 3-cyclohexyl-5,6-trimethyleneuracil*

A mixture of 343 parts by weight of ethyl 2-cyclopentanone-1-carboxylate, 284 parts by weight of cyclohexylurea, 10 parts by weight of p-toluene sulfonic acid, and 1750 parts by weight of xylene is stirred at reflux for 6 hours. During this time the water given off by the reaction is trapped out. The solvent is stripped from the resulting solution at reduced pressure. The residue is then dissolved in 793 parts by weight of absolute ethyl alcohol.

To this solution is added a mixture of 120 parts by weight of sodium methoxide in 400 parts by weight of absolute ethyl alcohol. The mixture is then refluxed for 10 minutes. The solvent is stripped from this mixture and the resulting solid is dissolved in 3000 parts by weight of water.

This solution is cooled, acidified with excess hydrochloric acid and the solid is filtered off. Recrystallization of this solid from dimethylformamide gives light gray crystals of the desired uracil, melting at 310–313° C.

The compounds listed in the following table can be prepared according to the procedures of Examples 1 or 2 by substituting equivalent amounts of the listed ureas and alkyl-2-cycloalkanone-1-carboxylates for those used in the examples:

the two solid components in water. The product can be readily diluted to use levels and sprayed.

| Substituted Urea | Parts by Weight | Ester of the Cycloalkanone Carboxylate | Parts by Weight | Substituted Uracil Product |
|---|---|---|---|---|
| 1-(2-heptyl) urea | 158 | Methyl 2-cyclopentanone-1-carboxylate | 156 | 3-(2-heptyl)-5, 6-trimethyleneuracil. |
| 1-(3-pentyl) urea | 130 | ....do | 156 | 3-(3-pentyl)-5, 6-trimethyleneuracil. |
| Tert-butylurea | 116 | Ethyl 2-cyclohexanone-1-carboxylate | 187 | 3-tert-butyl-5, 6-tetramethyleneuracil. |
| Cyclooctylurea | 170 | Methyl 2-cyclopentanone-1-carboxylate | 156 | 3-cyclooctyl-5, 6-trimethyleneuracil. |
| Cyclopentenylurea | 126 | ....do | 156 | 3-cyclopentenyl-5, 6-trimethyleneuracil. |
| Fenchylurea | 216 | ....do | 156 | 3-fenchyl-5, 6-trimethyleneuracil. |
| Cyclohexenyl urea | 138 | Ethyl 2-cycloheptanone-1-carboxylate | 202 | 3-cyclohexenyl-5, 6-pentamethyleneuracil. |
| Norbornenylurea | 150 | ....do | 202 | 3-norbornenyl-5, 6-pentamethyleneuracil. |
| Cyclobutylurea | 114 | ....do | 202 | 3-cyclobutyl-5, 6-pentamethyleneuracil. |
| Cyclopentylurea | 128 | Ethyl 2-cyclohexanone-1-carboxylate | 187 | 3-cyclopentyl-5, 6-tetramethyleneuracil. |
| 1-(4-methoxycyclohexyl) urea | 172 | ....do | 187 | 3-(4-methoxycyclohexyl)-5, 6-tetramethyleneuracil. |
| Cyclooctenylurea | 168 | Methyl 2-cyclohexanone-1-carboxylate | 162 | 3-cyclooctenyl-5, 6-tetramethyleneuracil. |
| Carvacrylurea | 191 | Methy 2-cyclopentanone-1-carboxylate | 156 | 3-carvacryl-5, 6-trimethyleneuracil. |
| Isopropylurea | 102 | Methyl 2-cyclohexanone-1-carboxylate | 162 | 3-isopropyl-5, 6-tetramethyleneuracil. |
| Cycloheptenylurea | 156 | Ethyl 2-cyclopentanone-1-carboxylate | 187 | 3-cycloheptenyl-5, 6-trimethyleneuracil. |
| Norbornylurea | 152 | Methyl 2-cyclopentanone-1-carboxylate | 156 | 3-norbornyl-5, 6-trimethyleneuracil. |
| Bicyclo(2,2,2)octylurea | 168 | ....do | 187 | 3-[bicyclo (2, 2, 2)octyl]-5,6-pentamethyleneuracil. |
| Hexahydro-4, 7-methano-indanyl urea | 195 | ....do | 187 | (3-hexahydro-4, 7-methano-indanyl)-5, 6-pentamethyleneuracil. |
| Bornylurea | 216 | ....do | 156 | 3-bornyl-5, 6-trimethyleneuracil. |
| 1-cyclohexyl urea | 154 | Ethyl 2-cyclohexanone-1-carboxylate | 156 | 3-cyclohexyl-5, 6-tetramethylene uracil. |
| Norbornylurea | 154 | ....do | 174 | 3-norbornyl-5, 6-tetramethyleneuracil. |
| Cyclopropylurea | 115 | Ethyl 2-cyclopentanone-1-carboxylate | 162 | 3-cyclopropyl-5, 6-trimethyleneuracil. |
| Hexahydroindanyl-urea | 182 | ....do | 162 | 3-hexahydroindanyl-5, 6-trimethyleneuracil. |
| 1-[3-(3-methyoctyl)]-urea | 190 | ....do | 162 | 3-[3-(3-methyloctyl)]-5, 6-trimethyleneuracil. |
| Cyclobutylurea | 112 | ....do | 162 | 3-cyclobutenyl-5, 6-trimethyleneuracil. |
| Decahydronaphthylurea | 196 | ....do | 162 | 3-decahydronaphthyl-5, 6-trimethyleneuracil. |
| 1-(4-isopropylcyclohexyl)urea | 185 | ....do | 162 | 3-(4-isopropylcyclohexyl)-5, 6-trimethyleneuracil. |
| 1-(1-ethylhexyl)urea | 158 | ....do | 162 | 3-(1-ethylhexyl)-5, 6-trimethyleneuracil. |
| 1-(1, 1-dimethyl-butyl)urea | 144 | Ethyl 2-cyclohexanone-1-carboxylate | 202 | 3-(1, 1-dimethylbutyl)-5, 6-tetramethyleneuracil. |
| 1-(3a, 4, 5, 6, 7, 7a-hexahydro-4, 7-methano-5-idenyl)urea. | 196 | Ethyl 2-cyclopentanone-1-carboxylate | 162 | 3-(3a, 4, 5, 6, 7, 7a-hexahydro-4, 7-methano-5-idenyl)-5, 6-trimethyleneuracil. |
| Do | 196 | Ethyl 2-cyclohexanone-1-carboxylate | 187 | 3-(3a, 4, 5, 6, 7, 7a-hexahydro-5-idenyl)-5, 6-tetramethyleneuracil. |
| Bicyclooctenylurea | 166 | ....do | 187 | 3-(bicyclooctenyl)-5, 6-tetramethyleneuracil |
| 1-(4-butyl cyclohexyl)-urea | 198 | ....do | 187 | 3-(4-butylcyclohexyl)-5, 6-tetramethyleneuracil. |
| 1-(2-chlorocyclohexyl)-urea | 173 | Ethyl 2-cyclopentanone-1-carboxylate | 162 | 3-(2-chlorocyclohexyl)-5, 6-trimethyleneuracil. |
| 1-(2-bromocyclohexyl)-urea | 222 | ....do | 162 | 3-(2-bromocyclohexyl)-5, 6-trimethyleneuracil. |

*Example 3.—Preparation of 3-isopropyl-5,6-trimethyleneuracil, sodium salt*

Into a solution of 12 parts by weight of sodium hydroxide and 100 parts by weight of water is added 58 parts by weight of 3-isopropyl-5,6-trimethyleneuracil. This slurry is heated and stirred until the solids are completely dissolved. The sodium salt of the uracil separates on cooling. More of the solid can be forced out of solution by dilution with acetonitrile. The salt is filtered off and dried.

*Example 4.—Preparation of 3-cyclohexyl-5,6-trimethyleneuracil, tetrabutylammonium salt*

A mixture containing 234 parts of 3-cyclohexyl-5,6-trimethyleneuracil and 865.8 parts of a one-molar solution of tetrabutylammonium hydroxide in methanol is stirred and heated slightly until solution is complete. The solvent is removed by distillation under reduced pressure. The resulting white solid is essentially pure 3-cyclohexyl-5,6-trimethyleneuracil, tetrabutylammonium salt.

Other quaternary ammonium salts can be similarly prepared by reacting equivalent amounts of an appropriately substituted uracil and a suitable quaternary ammonium hydroxide. The following compounds can be prepared in this fashion:

3-cyclopentenyl-5,6-tetramethyleneuracil, tetramethylammonium salt
3-bornyl-5,6-trimethyleneuracil, trimethylbenzylammonium salt
3-isopropyl-5,6-trimethyleneuracil, trimethyldodecylammonium salt

HERBICIDAL COMPOSITIONS.—LIQUID FORMULATIONS

*Example 5.—Aqueous concentrate*

A. An aqueous concentrate is prepared by dissolving

|  | Percent |
|---|---|
| 3-sec-amyl-5,6-trimethylene uracil, potassium salt | 5 |
| Sodium lauryl sulfate | 1 |
| Water | 94 |

This aqueous concentrate is applied with a pressure-type hand sprayer. Three pounds of active ingredient per acre in 40 gallons of water gives excellent preemergence control of foxtail, watergrass, Johnson grass seedlings in sugar cane.

B. The following substituted uracils in equivalent amounts can also be formulated as aqueous concentrates according to this procedure:

3-cyclopentenyl-5,6-trimethyleneuracil, potassium salt
3-sec-butyl-5,6-tetramethyleneuracil, sodium salt
3-cyclopentenyl-5,6-tetramethyleneuracil, lithium salt
3-cyclooctyl-5,6-tetramethyleneuracil, potassium salt
3-(decahydro-2-naphthyl)-5,6-trimethyleneuracil, potassium salt
3-bornyl-5,6-trimethyleneuracil, tetramethyl ammonium salt
3-cyclobutyl-5,6-trimethyleneuracil, sodium salt
3-fenchyl-5,6-trimethyleneuracil, tetraethylammonium salt
3-norbornyl-5,6-tetramethyleneuracil, tetrapropylammonium salt
3-norbornenyl-5,6-trimethyleneuracil, benzyltrimethylammonium salt
3-cyclohexyl-5,6-trimethyleneuracil, 2/1 6,7-dihydrodipyrido[1,2-a:2',1'-C]pyrazinium salt
3-sec-butyl-5,6-trimethyleneuracil, 2/1 6,7-dihydrodipyrido[1,2-a:2',1'-C]pyrazinium salt These formulations, applied at the rate of 20 pounds (active) in 100 gallons of water to weeds growing around bridge abutments, give excellent control of wild barley, bedstraw, hedge bindweed, wild carrot, cheat grass, cocklebur, dog fennel and goose grass.

*Example 6.—Aqueous suspension*

The following ingredients are mixed and pebble-milled or sand-milled until substantially all the particles of the active material are under 5 microns in size. The resulting stable thixotropic suspension does not cake on storage and is readily diluted with water to form a very slow settling suspension which requires no agitation during application.

| | Percent |
|---|---|
| 3-isopropyl-5,6-tetramethyleneuracil | 28.0 |
| Sodium lignin sulfonate | 15.0 |
| Hydrated attapulgite | 2.0 |
| Disodium phosphate | 0.8 |
| Sodium pentachlorophenate | 0.5 |
| Water | 53.7 |

This suspension, when applied as a directed spray at 2 pounds of active ingredient per acre in 30 gallons of water, gives good pre-emergence control of crab grass, mustard species, lamb's quarters, and rice grass germinating in sugar cane.

*Example 7.—Aqueous dispersion*

| | Percent |
|---|---|
| 3-cyclohexyl-5,6-trimethyleneuracil | 22.50 |
| 3-cyclohexyl-5-bromo-6-methyluracil | 7.50 |
| Sodium lignin sulfonate | 15.00 |
| Hydrated attapulgite clay | 1.75 |
| Water | 52.95–52.65 |
| NaOH (as needed) | 0.30–0.60 |

The mix is wet-milled until all particles are below 10 microns in size. The pH of the slurry is then adjusted to about 8.5.

This formulation gives exceptional control of vegetation around warehouses and industrial sites. It is dispersed in sufficient water to give good coverage of the area to be sprayed. Applied at the rate of 30 pounds of active ingredients per acre, it gives good control of existing weeds and keeps the area weed-free. Good control of such troublesome weeds as crabgrass, fall panicum, mares-tail, goatweed, smartweed, spotted spurge, morning glory, ragweed, pigweed, lamb's quarters, buttonweed, foxtail, broomsedge, and Russian thistle is obtained.

*Example 8.—Emulsifiable oil*

An emulsifiable oil is prepared by mixing the components to give an homogeneous solution. This solution can then be emulsified in water for application.

| | Percent |
|---|---|
| 3-(3-pentyl)-5,6-tetramethyleneuracil | 10.0 |
| Alkyl aryl polyether alcohol | 2.5 |
| Oil soluble petroleum sulfonate | 2.5 |
| Methyl isobutyl ketone | 85.0 |

This emulsifiable oil is useful for directed post-emergence weed control in cotton at lay-by. When applied at 2 pounds of active ingredients per acre in 30 gallons of water, it gives excellent control of germinating annual weeds such as crab grass, cocklebur, and water grass.

*Example 9.—Oil dispersions*

| | Percent |
|---|---|
| 3-cyclohexyl-5,6-trimethyleneuracil | 12.5 |
| 3-(3,4-dichlorophenyl)-1,1-dimethylurea | 12.5 |
| Paraffinic hydrocarbon (at least 90% unsulfonatable) | 72.0 |
| Soya lecithin | 3.0 |

These components are mixed together and then wet-milled until the particles are below 10 microns in size. The resulting oil suspension can be diluted further with oil for application.

This formulation is dispersed in 80 gallons of diesel oil and sprayed, in a blanket treatment, on vegetation and bare areas along railroad ballast. It is sprayed at a rate of 30 pounds of active ingredients per acre. Good control of Bermuda grass, ragweed, goldenrod, smartweed, seedling Johnson grass, spotted spurge, dogbane, and flower-of-an-hour is obtained.

*Example 10.—Oil dispersion*

| | Percent |
|---|---|
| 3-sec-butyl-5,6-trimethyleneuracil | 20.0 |
| 2-(2,4,5-trichlorophenoxy)propionic acid | 5.0 |
| Diesel oil | 75.0 |

These ingredients are mixed and then wet-milled until the particles of uracil are below 10 microns in size.

This formulation is used for the control of a wide variety of woody and herbaceous perennial weeds and grasses along highway rights-of-way. Dispersed in No. 2 fuel oil, it is sprayed at 15–20 pounds per acre of active ingredients on dense growths of weeds and brush on highway shoulders. Honeysuckle, brambles, water grass, goldenrod, ragweed, leafy spurge, seedling sassafras, maples, sweet gum, and poison ivy are controlled.

*Example 11.—Oil dispersion*

| | Percent |
|---|---|
| 3-cyclohexyl-5,6-tetramethyleneuracil | 20.0 |
| 2,3,6-trichlorobenzoic acid | 10.0 |
| Diesel oil | 70.0 |

These components are mixed and then wet-milled until the insoluble particles are under 10 microns in size.

This formulation is dispersed in 100 gallons of herbicidal oil and sprayed along an oil pipeline at the rate of 30 pounds of active ingredients per acre. Excellent control of leafy spurge, bindweed, panic grass, big bluestem, purpletop, poison ivy, quack grass, seedling oaks, maples, sweet gum, ragweed, goldenrod, honeysuckle, and brambles is obtained. The area is kept clear of troublesome weeds for an extended period.

SOLID FORMULATIONS

*Example 12.—Tank mix*

| | Percent |
|---|---|
| 3-cyclohexyl-5,6-tetramethyleneuracil | 80.00 |
| Alkyl naphthalene sulfonic acid, Na salt | 1.75 |
| Partially desulfonated sodium lignin | 1.00 |
| Attapulgite clay | 17.25 |

A wettable powder is prepared with these ingredients by blending and micropulverizing them.

Fifteen pounds of this wettable powder are dispersed in 100 gallons of a water solution containing 20 pounds of a formulation of 85% 2,2-dichloropropionic acid, sodium salt. This composition eradicates grasses and other troublesome weeds from warehouse areas. Excellent control of existing Bermuda grass, quack grass, Johnson grass, ragweed, crab grass, panicum species, and knotweed is obtained by an application of this spray mixture at 150 gallons per acre.

*Example 13.—Tank mix*

A wettable powder is prepared by blending and micropulverizing the following components:

| | Percent |
|---|---|
| 3-cyclohexyl-5,6-trimethyleneuracil | 80.00 |
| Alkyl naphthalene sulfonic acid, Na salt | 1.75 |
| Partially desulfonated sodium lignin sulfonate | 2.00 |
| Attapulgite clay | 17.25 |

This wettable powder and an emulsifiable oil containing 6 pounds per gallon of N,N-dipropylthiolcarbamic acid, ethyl ester are added to a spray tank to form a dilute mixture, in water, of ¾ to 1¼ pounds of uracil formulation and ½ gallon of the ester formulation per 100 gallons.

This dilute suspension-emulsion is applied at the volume rate of 100 gallons per acre to spring-seeded alfalfa. Good control of such weeds as chickweed, smartweed, portulaca, penny cress, yellow rocket, shepherd's purse, ragweed, redroot pigweed, crab grass, annual bluegrass, and henbit is obtained.

Example 14.—Tank mix

| | Percent |
|---|---|
| 3-sec-butyl-5,6-trimethyleneuracil | 60.0 |
| Mixed polyoxyethylene esters of fatty acids and oil-soluble petroleum sulfonates | 5.0 |
| Attapulgite clay | 35.0 |

An oil-dispersible powder of these ingredients is prepared by blending and then grinding them to a particle size of less than 50 microns.

Twenty pounds of this formulation are mixed in 100 gallons of 0.5% pentachlorophenol in diesel oil. The mixture is sprayed uniformly over an acre of weed-infested railroad right-of-way to give superior control of existing Johnson grass seedlings, big bluestem, cheat grass, fall panicum, smart weed, velvet leaf, ragweed, pigweed, and broomsedge.

Example 15.—Wettable powder

| | Percent |
|---|---|
| 3-cyclohexyl-5,6-trimethyleneuracil | 80.00 |
| Sodium dioctyl sulfosuccinate | 1.75 |
| Partially desulfonated sodium lignin sulfonate | 1.00 |
| Calcined, non-swelling montmorillonoid type clay (Pikes Peak Clay) | 17.25 |

A wettable powder is prepared by blending the components and then micropulverizing them until the particles of the active ingredient are substantially all under 50 microns in size, and then reblending to homogeneity.

When applied at 1 pound of active ingredient per acre in 40 gallons of water, this formulation gives excellent pre-emergence control of crab grass, foxtail, cocklebur, lamb's quarters, and burdock in a newly planted field of cotton. One to three pounds of active ingredient per acre gives good weed control in asparagus, sugar cane, and pineapple. One to two pounds per acre gives excellent pre-emergence control of annual weeds such as crab grass, foxtail, wild mustard, ryegrass, and velvetleaf in a newly planted field of spinach.

The following uracils can be similarly formulated, and when used in herbicidally equivalent amounts, will give good general weed control:

3-norbornyl-5,6-trimethyleneuracil
3-cycloheptyl-1,5,6-trimethyleneuracil
3-cyclooctyl-5,6-trimethyleneuracil

Example 16.—Wettable powder

A wettable powder is prepared by blending the following components, micropulverizing them until substantially all particles are under 50 microns in size, and then reblending:

| | Percent |
|---|---|
| 3-sec-butyl-5,6-trimethyleneuracil | 80.00 |
| Low viscosity methylcellulose | 0.25 |
| Alkyl naphthalene sulfonic acid, Na salt | 1.75 |
| Disodium phosphate (corrosion inhibitor) | 0.8 |
| Attapulgite clay | 17.20 |

This formulation is used as a general-purpose weed killer on industrial sites. At 10 to 20 pounds of active ingredient per acre in 100 gallons of water, excellent control of germinating goldenrod, evening primrose, pokeweed, ox-eye daisy, cocklebur, goose grass, crab grass, and love grass is obtained.

A similar wettable powder can be prepared with 3-(3-methylcyclohexyl)-5,6-trimethyleneuracil. Applied pre-emergence at 2 pounds (active) per acre in 40 gallons of water, excellent control of crab grass, foxtail, water grass, and mustard in a newly planted field of peanuts is obtained.

Example 17.—Wettable powder

The following powder is prepared in the same manner as Example 28, but in addition is passed through an air attrition mill, such as an air-reductionizer, to reduce the particle size to under 10 microns:

| | Percent |
|---|---|
| 3-tert-butyl-5,6-trimethyleneuracil | 80.0 |
| Dioctyl sodium sulfosuccinate concreted with sodium benzoate (Aerosol OTB) | 2.0 |
| Partially desulfonated sodium lignin sulfonate | 1.0 |
| Calcined, non-swelling montmorillonoid type clay (Pikes Peak clay) | 17.0 |

This composition is used for pre-emergence application in agricultural crops such as sugar cane, asparagus, and safflower. It is dispersed in 40 gallons of water and sprayed with a pressure sprayer. At 0.5 to 2.0 pounds of active ingredient per acre, excellent control of pigweed, lamb's quarters, purslane, mustard, crab grass, foxtail, and water grass is obtained.

Example 18—Wettable powder

The following are blended, then micropulverized until the particles are below 50 microns in diameter, and reblended:

| | Percent |
|---|---|
| 3-bornyl-5,6-trimethyleneuracil | 25 |
| Alkylnaphthalene sulfonic acid, sodium salt | 1 |
| Partially desulfonated sodium lignin sulfonate | 1 |
| Attapulgite clay | 75 |

This wettable powder is suspended in water at a concentration of 15–20 pounds of active ingredient per 100 gallons of water. This suspension is sprayed at the rate of 100 gallons per acre for control of crab grass, water grass and lamb's quarters growing around telephone poles.

Example 19.—Wettable powder

| | Percent |
|---|---|
| 3-(norbornenyl)-5,6-trimethyleneuracil | 75.0 |
| Dioctyl sodium sulfosuccinate | 0.5 |
| Ditertiary acetylenic glycol | 0.5 |
| Coconut acid ester of sodium isethionate | 0.5 |
| Precipitated sodium silico aluminate | 23.5 |

These components are mixed, and micropulverized until the particles are less than 50 microns in diameter.

An application of this formulation at 25 pounds (active) in 80 gallons water controls beggar tick, wild mustard, lamb's quarters, plantain, velvetleaf, annual bluegrass, Canadian bluegrass, crab grass, foxtail, and seedling Johnson grass growing around radar installations.

The following compounds can be formulated in a similar fashion. When used in the same way, at equivalent rates, they give good weed control.

3-(bicyclo[2,2,2]oct-5-en-2-yl)-5,6-trimethyleneuracil
3-(5,6,7,8-tetrahydronaphthyl)-5,6-trimethyleneuracil
3-isopropyl-5,6-trimethyleneuracil
3-cyclohexyl-5,6-pentamethyleneuracil

Example 20.—Wettable powder

| | Percent |
|---|---|
| 3-cyclohexyl-5,6-trimethyleneuracil | 16.0 |
| 3,6-endoxohexahydrophthalic acid | 64.0 |
| Polyoxyethylene tall oil acid ester | 3.0 |
| Low viscosity polyvinyl alcohol | 0.5 |
| Synthetic fine silica | 16.5 |

This wettable powder is prepared by blending the components and then micropulverizing the mixture until the particles are under 50 microns in size.

This formulation is dispersed in water and sprayed pre-emergence at 5 pounds of active ingredients per acre on a planting of red table beets. Excellent control of crab grass, chickweed, annual morning glory, carpetweed, purslane, smartweed, lamb's quarters, ragweed, black nightshade, giant foxtail, and velvet leaf is obtained. The crop shows no visible injury.

*Example 21.—Wettable powder*

| | Percent |
|---|---|
| 3-sec-butyl-5,6-trimethyleneuracil | 40.0 |
| 3-(4-chlorophenyl)-1,1-dimethylurea | 20.0 |
| Alkyl naphthalene sulfonate, Na salt | 1.5 |
| Low viscosity methyl cellulose | 0.5 |
| Attapulgite clay | 38.0 |

A wettable powder is prepared by blending these components and then micropulverizing the mixture until the particles are below 50 microns in size.

This formulation controls weeds along railroad rights-of-way. Applied in the spring in about 100 gallons of water and at the rate of 25 pounds of active ingredients per acre, the formulation gives good control of annual ryegrass, bromegrass, ragweed, henbit, goldenrod, field daisy, buckhorn plantain, water grass, and volunteer rye.

*Example 22.—Wettable powder*

| | Percent |
|---|---|
| 3-cyclohexyl-5,6-tetramethyleneuracil | 40.0 |
| 2-chloro-4-ethylamino-6-isopropyl-amino-s-triazine | 20.0 |
| Dioctyl sodium sulfosuccinate concreted 85–15 with sodium benzoate | 1.0 |
| Low viscosity methyl cellulose | 0.3 |
| Calcined montmorillonoid clay | 38.7 |

A wettable powder is prepared by blending these ingredients and then grinding them until the particles are below 50 microns in size.

A tractor-mounted sprayer which sprays four rows at a time is used to apply this formulation to a field of potatoes, before the potatoes emerge. The formulation is used at a rate of 3 pounds of active ingredients per acre. Such weeds as crab grass, chickweed, smartweed, purslane, giant foxtail, annual morning glory, Johnson grass seedlings, barnyard grass, bedstraw, and henbit are controlled without visible injury to the potatoes. Excellent yields of potatoes are obtained, with minimum cultivation.

*Example 23.—Wettable powder*

A.

| | Percent |
|---|---|
| 1-(3,4-dichlorophenyl)-3,3-dimethylurea | 80.00 |
| Low viscosity methyl cellulose | 0.25 |
| Alkyl naphthalene sulfonic acid, sodium salt | 1.75 |
| Disodium phosphate | 0.80 |
| Attapulgite clay | 17.20 |

These ingredients are blended, micropulverized until all particles are below 50 microns in diameter, and then reblended.

B.

| | Percent |
|---|---|
| 3-cyclohexyl-5,6-trimethyleneuracil | 80.00 |
| Alkylnaphthalene sulfonic acid, sodium salt | 1.75 |
| Partially desulfonated sodium lignin sulfonate | 1.00 |
| Calcined non-swelling montmorillonite clay | 17.25 |

These ingredients are blended, micropulverized until all particles are below 50 microns in diameter, and then reblended.

Nine parts (active) of the uracil formulation are mixed with one part (active) of the urea formulation.

This mixture, applied at 1.25–2 pounds (total active herbicides) per acre in 40 gallons of water to a new planting of sugar beets, gives excellent control of foxtail, crab grass, barnyard grass, pigweed, lamb's quarters, ragweed and velvetleaf.

*Example 24.—Pellets*

| | Percent |
|---|---|
| 3-cyclohexyl-5,6-tetramethyleneuracil | 25 |
| Anhydrous sodium sulfate | 10 |
| Sodium lignin sulfonate | 10 |
| Ca, Mg bentonite | 55 |

These components are blended and micropulverized, then moistened with 18–20% water and extruded through small die holes. The extrusions are cut as formed to give small pellets which are then dried.

These pellets control both annual and perennial weeds along highway guard rails, around bridges, cyclone fences, and highway signs when applied by hand at levels of 15 to 30 pounds of active ingredient per acre.

The following uracils, when formulated in this manner and used at herbicidally equivalent rates, give good weed control:

3-tert-butyl-5,6-pentamethyleneuracil
3-cyclopropyl-5,6-tetramethyleneuracil
3-cyclopentyl-5,6-tetramethyleneuracil
3-norbornyl-5,6-tetramethyleneuracil
3-(decahydro-1,4,5,8-dimethanonaphth-2-yl)-5,6-trimethyleneuracil
3-sec-butyl-5,6-pentamethyleneuracil

*Example 25.—Pellets*

| | Percent |
|---|---|
| 3-cyclohexyl-5,6-trimethyleneuracil | 4 |
| 3-(p-chlorophenyl)-1,1-dimethylurea | 2 |
| Kaolin clay | 37 |
| Mississippi sub-bentonite clay | 37 |
| Sodium sulfate | 10 |
| Sodium lignin sulfonate | 10 |

These ingredients are blended, micropulverized, pug-milled with 17%–20% water, and then extruded through $\frac{3}{32}$-inch die holes. The extrusions are cut into $\frac{1}{16}$-inch lengths and dried.

This formulation controls annual grasses and herbaceous broadleaved weeds in asparagus beds. The pellets are distributed evenly over the top of the beds at a rate of 3 pounds of active ingredients per acre just before the cutting season begins and again at the end of the cutting season. Excellent control of crab grass, blackeyed Susan, beggar-ticks, prickly lettuce, ragweed, barnyard grass, green foxtail, pigweed, and fall panicum is obtained.

*Example 26.—Pellets*

| | Percent |
|---|---|
| 3-isopropyl-5,6-trimethyleneuracil | 3.33 |
| Phenyldimethylurea | 6.67 |
| California sub-bentonite clay | 80.00 |
| Sodium sulfate, anhydrous | 10.00 |

These ingredients are blended, micropulverized, pug-milled with 15%–20% water, and extruded through $\frac{1}{8}$-inch holes. The extrusions are cut into $\frac{1}{8}$-inch lengths, dried, and screened.

This formulation is used to control all vegetation in a fire lane. The pellets are distributed from the air in remote areas of the fire lane at the rate of 40 pounds of active ingredients per acre. Excellent control of elm, sweet gum, oaks, maples, brambles, goldenrod, blackeyed Susan, and honeysuckle is obtained.

*Example 27.—Pellets*

| | Percent |
|---|---|
| 3-cyclohexyl-5,6-trimethyleneuracil | 6.67 |
| 3-sec-butyl-5-chloro-6-methyluracil | 3.33 |
| Sodium sulfate, anhydrous | 10.00 |
| Californiia sub-bentonite clay | 80.00 |

These ingredients are pelletized in the manner of Example 26.

This formulation keeps lumber yards free of weeds. The pellets are distributed in the spring with a seeder at 20 pounds (active) per acre. The lumber-yard stacking area is kept free of such pernicious weeds as crab grass, ragweed, pigweed, Russian thistle, fall panicum, goat weed, cheat grass, and seedling Johnson grass.

*Examples 28.—Granules*

| | Percent |
|---|---|
| 3-isopropyl-5,6-trimethyleneuracil, Na salt | 5 |
| 8–15 mesh granular, expaned vermiculite | 95 |

This granular composition is prepared by dissolving the active material in water and spraying it upon the granules while they are being tumbled. The granules are then dried.

These granules are applied at 25 pounds of active ingredient per acre to mixed annular and perennial vegetation growing under cyclone fences, around highway markers, along fence rows, and around oil tank installations. Excellent weed control is obtained.

The following compounds can be formulated in a like manner, and when used in herbicidally equivalent amounts, will give good weed control:

3-cyclopentyl-5,6-pentamethyleneuracil, tetramethylammonium salt
3-cyclohexyl-5,6-trimethyleneuracil, tetramethylammonium salt
3-sec-butyl-5,6-trimethyleneuracil, tetrabutylammonium salt
3-tert-butyl-5,6-trimethyleneuracil, tetrabutylammonium salt
3-sec-amyl-5,6-trimethyleneuracil, sodium salt
3-isopropyl-5,6-trimethyleneuracil, trimethylbenzylammonium salt
3-($\alpha$-decahydro-1,4-5,8-dimethanonaphthyl)-5,6-trimethyleneuracil, sodium salt

*Examples 29.—Granules*

The following composition is prepared by dissolving the active ingredient in water and spraying the solution upon the attapulgite granules while they are being tumbled. The granules are then dried.

| | Percent |
|---|---|
| 3-isopropyl-5,6-trimethyleneuracil, sodium salt | 4 |
| Granular 8–15 mesh attapulgite clay | 96 |

These granules are applied by hand or by special spreaders at 2.5 pounds of active ingredient per acre for the pre-emergence control of annual weeds in potatoes. They control crab grass, chickweed, barnyard grass, goose grass, foxtail, velvetleaf, and germinating Johnson grass without visible injury to the crop.

*Examples 30.—Granules*

| | Percent |
|---|---|
| 3-cyclohexyl-5,6-trimethyleneuracil | 16.67 |
| 2-ethylamino-4-isopropylamino-6-methylthio-s-triazine | 8.33 |
| Kaolin clay | 72.00 |
| Low viscosity methyl cellulose | 3.00 |

The ingredients are blended and micropulverized, then pug-milled with 15 to 20% water, and moist-granulated. After drying, the granules are screened to 8–30 mesh.

These granules are distributed along the bank of a drainage canal. Applied at 120 pounds of granules per acre, good control of an existing rank growth of canary grass, smartweed, pigweed, and goldenrod is obtained.

*Example 31.—Granules*

| | Percent |
|---|---|
| 3-isopropyl-5,6-trimethyleneuracil | 2.00 |
| Polyoxyethylene tall oil acid ester | 0.02 |
| Sodium chlorate 40%, sodium metaborate 60% | 97.98 |

The surfactant and uracil are first mixed and micropulverized, then suspended in water and sprayed on the remaining granular components while they are being tumbled.

These granules are distributed by hand at the rate of about 1.5 pounds per 100 square feet around airport signal lights. Excellent control of Johnson grass, brambles, poison ivy, honeysuckle, pigweed, ragweed, bindweed, Bermuda grass, cheat grass, and big bluestem is obtained.

*Example 32.—Granules*

| | Percent |
|---|---|
| 3-cyclohexyl-5,6-trimethyleneuracil | 1.0 |
| Trichloroacetic acid, sodium salt | 3.0 |
| Attapulgite clay, granular 15–30 mesh | 96.0 |

The uracil is micropulverized, suspended in a concentrated aqueous solution of the trichloroacetic acid salt, sprayed on attaclay while it is being tumbled, and then dried.

These granules are laid down in a 14-inch band centered on the row in a sugar beet field. They are applied at the rate of 5 pounds of active ingredients per acre. The sugar beets germinate and grow normally, but chickweed, crab grass, crowfoot, cheat grass, ragweed, lamb's quarters, little bluestem, foxtail, barnyard grass, and hoary cress are controlled.

The claims are:
1. A compound selected from the group consisting of:
   (a) Compounds of the formula $$\underset{\substack{O \\ \| \\ R-N \\ O= \overset{}{\underset{H}{N}}}}{\overset{}{\bigcirc}}(CH_2)_n \rightleftarrows \underset{\substack{O \\ \| \\ R-N \\ HO-\overset{}{\underset{N}{}}}}{\overset{}{\bigcirc}}(CH_2)_n$$

where:
R is cycloalkyl containing 3 through 10 carbon atoms, substituted cycloalkyl containing 3 through 10 carbon atoms wherein said substituent is selected from the group consisting of alkyl containing 1–4 carbon atoms, chlorine, bromine, and methoxy; cycloalkenyl containing 4 through 10 carbon atoms; substituted cycloalkenyl containing 4 through 10 carbon atoms wherein said substituent is selected from the group consisting of alkyl containing 1–4 carbon atoms, chlorine, bromine, and methoxy, or $$C\begin{array}{l} R_1 \\ -R_2 \\ R_3 \end{array}$$

wherein:
$R_1$ is methyl or ethyl,
$R_2$ is alkyl containing 1 through 5 carbons atoms, and
$R_3$ is hydrogen or methyl, and
$n$ is 3, 4, or 5; and
   (b) the sodium, potassium, lithium, and alkyl quaternary ammonium salts of the compounds of (a).
2. 3-cyclohexyl-5,6-trimethyleneuracil.
3. 3-isopropyl-5,6-trimethyleneuracil.
4. 3-sec-butyl-5,6-tetramethyleneuracil.
5. 3-cyclohexyl-5,6-tetramethyleneuracil.
6. 3-tert-butyl-5,6-trimethyleneuracil.

No references cited.

NICHOLAS S. RIZZO, *Primary Examiner.*

M. U. O'BRIEN, F. A. MIKA, *Assistant Examiners.*